H. E. MORGAN.
Bean-Harvesters.

No. 150,599. Patented May 5, 1874.

WITNESSES:
H. L. Wattenberg
M. Lovell

INVENTOR:
Hance E. Morgan
BY
ATTORNEY.

UNITED STATES PATENT OFFICE.

HANCE E. MORGAN, OF WATERFORD, MICHIGAN.

IMPROVEMENT IN BEAN-HARVESTERS.

Specification forming part of Letters Patent No. 150,599, dated May 5, 1874; application filed March 10, 1874.

*To all whom it may concern:*

Be it known that I, HANCE E. MORGAN, of Waterford, in the county of Oakland and State of Michigan, have invented a new and Improved Bean-Harvester; and that the following is a full, clear, and exact description of the same, reference being had to the accompanying drawings, and to the letters of reference marked thereon, making a part of this specification:

This invention is in the nature of an improvement in an agricultural implement for gathering beans; and the invention consists in a bean-harvester with an appliance for raising the vines, holding the vines in a raised position, and a device for severing the raised vines, all constructed and operated as hereinafter fully described.

Figure 1:
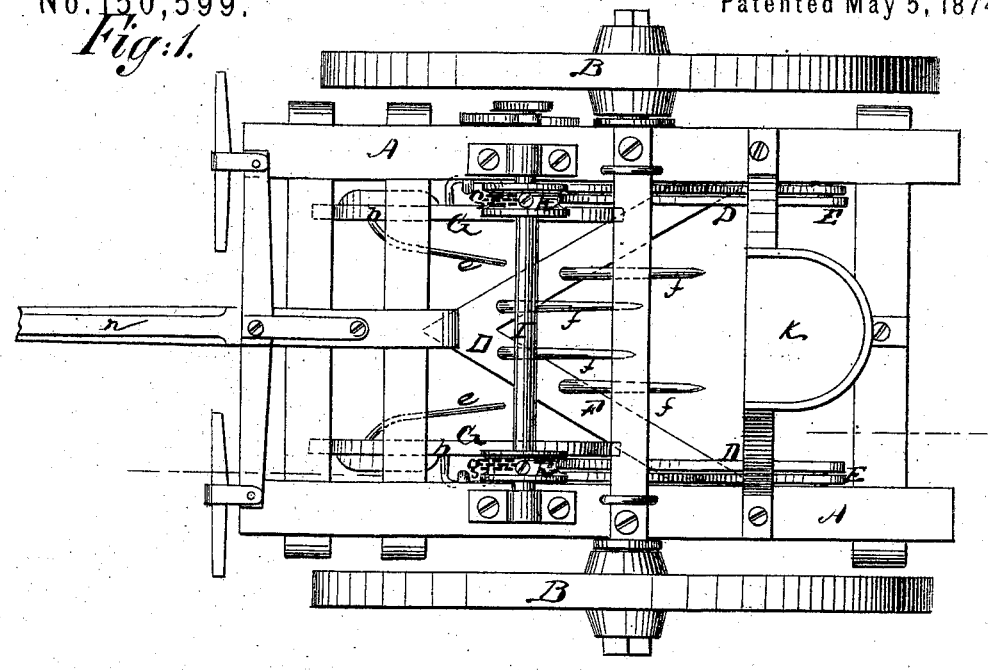
Figure 2:
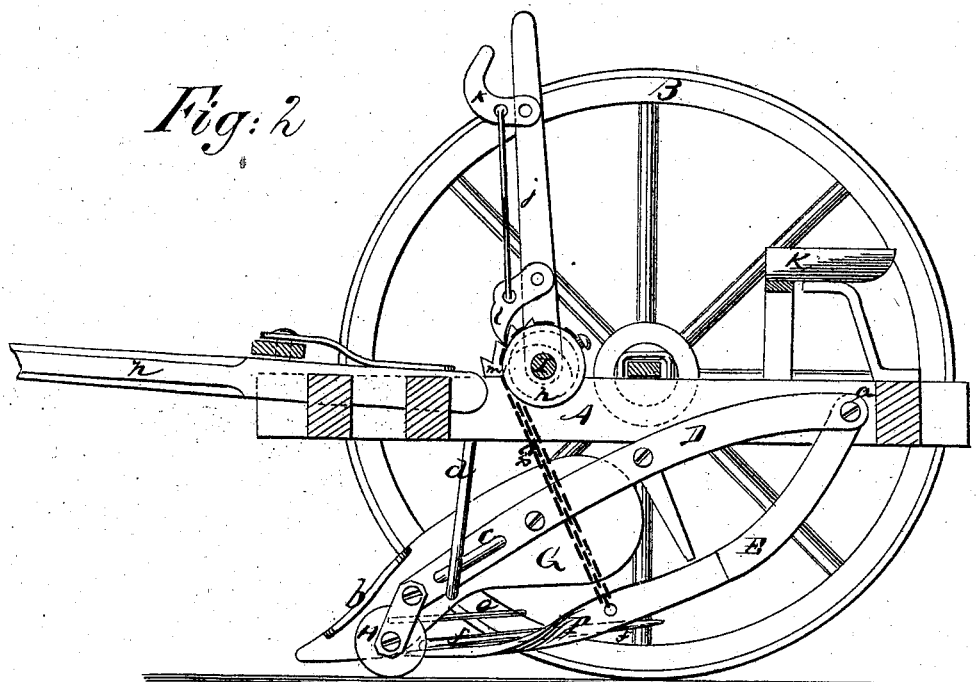

In the accompanying sheet of drawings, Figure 1 is a plan or top view of my bean-harvester; and Fig. 2, a side view, partly in section.

Similar letters of reference indicate like parts in the several figures.

A is the frame-work of my bean-harvester, supported by wheels B. To the inner side of the frame A, and near its rear end, are secured, by pivotal bolts $a$, two curved arms or braces, D, and also the arms E of the severing device F. To the inner side of the arms or braces D are bolted wooden cheek-pieces G G. These cheek-pieces are formed on their front ends somewhat like the plow of a cultivator, and are shod with iron straps $b$. On the outer side of the cheek-pieces, and near their front ends or points, are secured two wheels, H. These wheels project below the under surface of the forward ends of the cheek-pieces G, so that, when on the ground, they raise the points of the cheek-pieces slightly off from the surface of the ground, the several parts constituting the gathering device. To the outer side of each arm D are secured two staples, $c$, and passing through said staples, and secured to the under side of the frame A, are two iron loops or staples, $d$. In the inner side and near the points of the cheek-pieces G, and extending backward from the same, are two iron rods, $e$. The severing device F is V-shaped, with sharpened edges, and is in position a little in the rear of the points of the cheek-pieces G, but on the same level with them. Extending backward from the surface of the V-shaped sides of the severing device are a series of rods, $f$. From the arms E of the severing device extend upward two chains, $g\ g$, passing around drums $h\ h$ on a shaft, I, the shaft extending from one side of the frame A to the other, and the drums being affixed to it so as to be one on the inner side of each rail of the frame A. To one end of the shaft I is secured a lever, $j$, having affixed to it a small lever, $k$, which operates a movable pawl, $l$, so that it may engage with a curved ratchet, $m$, which is secured to the frame A. Near the rear end of the frame A is affixed a slat, K. The front side of the frame A is supplied with a pole, $n$, and the ordinary double bar and single-trees.

My bean-harvester being constructed substantially as above described, its operation is as follows: The team being hitched to the pole $n$, the harvester is driven through the field of beans. The cheek-pieces G, or gatherers, being supported by the wheels H just above, but close to, the surface of the ground, pass under the bean-vines, lift them into a standing position; the rods $e$, pressing against the stems and under the pods, hold them firmly until the V-point of the severing device F passes under the vines, severing them from the ground, when they fall back upon the rods $f$, these rods preventing the loosened dirt from falling among the roots. The severing device or its V-point should be run two or three inches under the surface of the ground. This will bring the rods $f$ just on top of the ground, and as they pass from under the severed vines they leave the vines in the rear well spread out for gathering. The staple-shaped arms D, passing through the staples $d$, prevent the cheek-pieces or gatherers G from having a lateral motion, and, at the same time, permit them to rise and fall to correspond with the undulations of the surface of the ground, acting in this respect as guides. It will be observed that the cheek-pieces or gatherers G rise and fall independently of each other, and of the severing device, except when the severing device is raised clear from the surface of the ground. In that event the cheek-pieces or gatherers are brought in contact with the arms of the severing device, and rise with it. This raising and lowering of the severing device is accomplished by the chains $g\ g$, attached to the drums $h\ h$ on the shaft I, the shaft being rotated by moving the lever $j$ backward. In this way the severing and gathering devices may be raised from the surface of the ground to any required height, and may be held in such position by the pawl $l$ fitting into the ratchet $m$.

Having thus described my bean-harvester, what I claim as new, and desire to secure by Letters Patent, is—

1. A bean-harvester with the gathering-arms pivoted to the rear end of the frame, and having cheek-pieces G, vine-supporting rods $e$, and shoes $b$, substantially as and for the purpose specified.

2. In combination with the gathering-arms D D, the guides $c\ d$, substantially as and for the purpose specified.

3. In a bean-harvester, gathering-arms constructed substantially as described, and having vertical play independently of one another, as and for the purpose specified.

4. In a bean-harvester, the vine-severing device pivoted to the rear of the frame, and constructed with a V-shaped cutting-edge and the rods $f$, as and for the purpose described.

5. In a bean-harvester, the combination of the independently-pivoted gathering devices and severing device, constructed and operating substantially as specified.

HANCE E. MORGAN.

Witnesses:
JOHN BOGARDUS,
GEO. ROBERTSON.